(12) United States Patent
Rado (10) Patent No.: US 10,024,447 B2
(45) Date of Patent: Jul. 17, 2018

(54) MODULAR MANIFOLD ASSEMBLY FOR SEQUENTIALLY DRAWING FLUID FROM FLUID STORAGE TANKS

(71) Applicant: SCOTT TECHNOLOGIES, INC., Boca Raton, FL (US)

(72) Inventor: Gordon E. Rado, Waxhaw, NC (US)

(73) Assignee: Scott Technologies, Inc.

(*) Notice: Subject to any disclaimer, the term of this patent is extended or adjusted under 35 U.S.C. 154(b) by 0 days.

(21) Appl. No.: 15/313,400

(22) PCT Filed: May 28, 2015

(86) PCT No.: PCT/US2015/032880
§ 371 (c)(1),
(2) Date: Nov. 22, 2016

(87) PCT Pub. No.: WO2015/184091
PCT Pub. Date: Dec. 3, 2015

(65) Prior Publication Data
US 2017/0198827 A1    Jul. 13, 2017

Related U.S. Application Data

(60) Provisional application No. 62/003,743, filed on May 28, 2014.

(51) Int. Cl.
*F16K 27/00* (2006.01)
*F17C 5/06* (2006.01)
(Continued)

(52) U.S. Cl.
CPC ............. *F16K 27/003* (2013.01); *F17C 5/06* (2013.01); *A62B 9/00* (2013.01); *B63C 11/18* (2013.01);
(Continued)

(58) Field of Classification Search
CPC ... F16K 27/003; F17C 5/06; Y10T 137/86501
See application file for complete search history.

(56) References Cited

U.S. PATENT DOCUMENTS 2,947,318 A * 8/1960 Odom .................. G05D 7/0635
137/122
3,544,289 A * 12/1970 Berlin ..................... F17C 13/12
48/174

(Continued)

FOREIGN PATENT DOCUMENTS

| EP | 1987862 B1 | 12/2010 |
| RU | 2178113 C2 | 1/2002 |
| RU | 2189522 C1 | 9/2002 |

OTHER PUBLICATIONS

International Search Report and Written Opinion of the International Searching Authority, dated Oct. 1, 2015, for International Application Serial No. PCT/US2015/032880, International Filing Date May 28, 2015, consisting of 5-pages.

*Primary Examiner* — Craig Schneider
*Assistant Examiner* — Kevin Barss (57) ABSTRACT

A modular manifold assembly is configured to connect to a manifold block of an auto cascade system used to fill an individual fluid tank. The modular manifold assembly may include a main housing that contains one or more sequence valves and fluid conduits. The sequence valve(s) are configured to allow fluid to be sequentially drawn from a plurality of fluid storage cylinders.

16 Claims, 8 Drawing Sheets

(51) Int. Cl.
*A62B 9/00* (2006.01)
*B63C 11/18* (2006.01)

(52) U.S. Cl.
CPC ........... *F17C 2205/0146* (2013.01); *F17C 2205/0323* (2013.01); *F17C 2205/0335* (2013.01); *F17C 2205/0338* (2013.01); *F17C 2205/0385* (2013.01); *F17C 2221/031* (2013.01); *F17C 2227/043* (2013.01); *F17C 2270/025* (2013.01)

(56) References Cited

U.S. PATENT DOCUMENTS

| | | | | |
|---|---|---|---|---|
| 5,884,675 A * | 3/1999 | Krasnov | ............ | F17C 5/06 141/18 |
| 6,722,399 B1 * | 4/2004 | Cano | ............ | F17C 7/00 141/18 |
| 7,334,595 B2 * | 2/2008 | Birtcher | ............ | B67D 7/0272 134/1.3 |
| 7,905,252 B2 * | 3/2011 | Neumann | ............ | F17C 5/06 137/512.4 |
| 9,194,508 B2 * | 11/2015 | Andersen | ............ | F16K 27/003 |
| 9,243,753 B2 * | 1/2016 | Wonders | ............ | F17C 5/06 |
| 2012/0168007 A1 * | 7/2012 | Wonders | ............ | H01H 35/247 137/551 |

* cited by examiner

MODULAR MANIFOLD ASSEMBLY FOR SEQUENTIALLY DRAWING FLUID FROM FLUID STORAGE TANKS

CROSS-REFERENCE TO RELATED APPLICATIONS

This application is a Submission Under 35 U.S.C. § 371 for U.S. National Stage Patent Application of International Application Number: PCT/US2015/032880, filed May 28, 2015, entitled "MODULAR MANIFOLD ASSEMBLY FOR SEQUENTIALLY DRAWING FLUID FROM FLUID STORAGE TANKS," which claims priority to U.S. Provisional Application No. 62/003,743, filed May 28, 2014, the entirety of both which are incorporated herein by reference.

FIELD OF THE DISCLOSURE

Embodiments of the present disclosure generally relate to systems and methods for filling fluid containers, such as pressurized fluid cylinders, tanks, and the like.

BACKGROUND OF THE DISCLOSURE

Pressurized fluid cylinders are used in various settings. For example, a self-contained breathing apparatus (SCBA) typically includes an air cylinder that is used to provide safe, clean air to an individual for breathing. An SCBA is configured to be worn by individuals, such as rescue workers, firefighters, and others, to provide breathable air in a hazardous or otherwise unsafe atmosphere. When configured for use underwater, an SCBA is typically referred to as a self-contained underwater breathing apparatus (SCUBA).

An SCBA typically includes a high-pressure tank (for example, 4,500 psi) that connects to a pressure regulator, which in turn connects an inhalation connection, such as a mouthpiece, mouth mask, or face mask. At least one of the tank, regulator, and inhalation connection may be secured to a carrying frame that allows an individual to carry the SCBA on his/her back, for example.

After use, a fluid tank or cylinder needs to be re-filled for future use. One system and method for filling a fluid container includes a plurality of storage cylinders. For example, four storage cylinders may be connected together. Fluid within the storage cylinders may be sequentially drawn from the storage cylinders to the fluid container. A known method of filling a fluid tank includes manually operating the storage cylinders. However, human error may result in the fluid tank being under-filled, for example.

Accordingly, automatic systems and methods have been developed to fill a fluid tank. A sequence valve may be used to determine fluid pressure within a fluid cylinder to be filled, and fluid pressure within the storage cylinders, and then fill the fluid cylinder from the storage cylinders in sequence.

A known automatic system provides an auto cascade system that is used to fill a fluid cylinder. A typical auto cascade system includes multiple pipe thread fittings strung together with tubing and framed in a sheet metal enclosure. The process of assembling a typical auto cascade system is generally labor-intensive. Further, a typical auto cascade system is prone to leakage, due to the numerous fittings and connections. Also, a typical auto cascade system is difficult to service. Moreover, a typical auto cascade system is bulky and is usually mounted externally to a pneumatic control system and joined to it via multiple high pressure hoses.

A known system and method includes a series of cartridge type sequence valves inserted into a manifold block arranged in a linear fashion. However, this manifold system utilizes external plumbing between the cartridge valves, and external plumbing to other parts of the pneumatic control system. Further, the cartridge valves typically include large diameter radial seal O-rings that are prone to leakage under high pressure.

SUMMARY OF THE DISCLOSURE

Embodiments of the present disclosure provide a unitary, integral manifold block or assembly that may include sequence valves arranged in a circular pattern and related check valves in a radial pattern eliminating the need for external plumbing. The individual hardware components may be assembled directly into the manifold block (rather than as cartridges) and all external openings may be sealed with O-ring plugs, for example. The manifold may mount directly to a main control manifold face where it is sealed by face type O-ring joints further avoiding the need for external plumbing. This construction allows the entire manifold to be quickly removed for service or replacement.

Certain embodiments of the present disclosure provide a modular auto cascade manifold block architecture that replaces a multitude of pipe fittings and tubes, for example.

Certain embodiments of the present disclosure provide a modular manifold assembly that is configured to connect to a manifold block of an auto cascade system, which may be used to fill an individual fluid tank. The modular manifold assembly may include a main housing that contains one or more sequence valves and fluid conduits. The sequence valve(s) may be configured to allow fluid to be sequentially drawn from a plurality of fluid storage cylinders. The one or more sequence valves may include a plurality of sequence valves arranged in a circular pattern within the main housing. The modular manifold assembly may also include one or more check valves connected to the one or more sequence valves. The main housing may be devoid of external plumbing.

The sequence valve(s) may be connected to a main fluid supply line. The modular manifold assembly may also include a storage refill passage connected to storage cylinder fittings, and at least one check valve disposed between the storage cylinder fittings and the storage refill passage.

DETAILED DESCRIPTION OF THE DISCLOSURE

The foregoing summary, as well as the following detailed description of certain embodiments will be better understood when read in conjunction with the appended drawings. As used herein, an element or step recited in the singular and proceeded with the word "a" or "an" should be understood as not excluding plural of the elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide an auto cascade manifold assembly that may be configured to control dispensation of compressed gas from multiple banks of storage cylinders to user fluid cylinders, such as SCBA or SCUBA tanks. The auto cascade manifold assembly may also be configured to control refilling of the storage cylinder banks from either a compressor and/or a compressed gas storage cylinder.

With respect to the method of filling a fluid cylinder, the controlled gas flow out of the storage cylinder banks may be managed by a series of sequence and check valves. The internal components of the valves may be installed in a common manifold block assembly.

Figure 1:
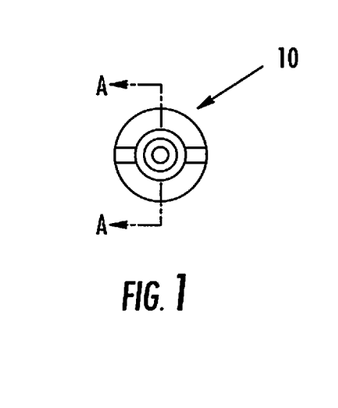
FIG. 1 illustrates an end view of a sequence valve, according to an embodiment of the present disclosure.
Figure 2:
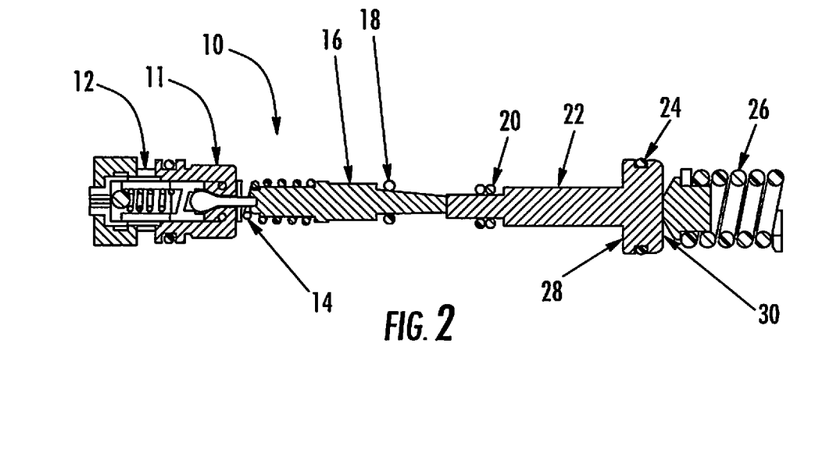
FIG. 2 illustrates a transverse cross-sectional view of a sequence valve through line A-A of FIG. 1, according to an embodiment of the present disclosure.

FIG. 1 illustrates an end view of a sequence valve 10, according to an embodiment of the present disclosure. FIG. 2 illustrates a transverse cross-sectional view of the sequence valve 10 through line A-A of FIG. 1. FIGS. 1 and 2 illustrates and describe internal components of the sequence valve 10. Referring to FIGS. 1 and 2, the sequence valve 10 may include a valve 11 having a valve inlet passage 12 and a valve outlet passage 14. The sequence valve 10 may also include a control rod 16, a first seal 18, a second seal 20, a piston 22, a third seal 24, and a bias spring 26. The piston 22 may include a lower surface 28 and an upper surface 30.

When the storage cylinders are empty, there is no pressure acting on the surface 28, and the bias spring 26 pushes on the piston 22, which forces the control rod 16 against the valve 11 causing it to open. To initiate the process of cylinder filling, the manual valves on the storage cylinders are opened. As air supplied from either a compressor or large storage cylinder is used to fill the system storage cylinders, the pressure from the next lower pressure storage cylinder acts on each of the piston lower surfaces overcoming the force of the bias spring 26 and closing the valve 11. As such, when the storage cylinders are full, all sequence valves 10 within a manifold assembly may be closed.

To initiate the process of filling breathing air cylinders from the storage cylinders, the lowest pressure storage cylinder within a bank of cylinders may not be controlled by a sequence valve. As such, pressurized air may flow from this cylinder first. During this time, the pressure in the fluid cylinder(s) being filled steadily increases. A communication passage may be formed within a manifold assembly back from these cylinders to the piston upper surface 30. As such, the referenced pressure (equal to the pressure in the breathing air cylinder) may exert a force on the piston countering the force from the air pressure acting on the lower surface of the piston. The net result is that at some point in the filling process, the fluid pressure in the first storage cylinder drops enough to make the resulting force acting on the lower surface of the piston less than the force on the upper surface of the piston. When this point is reached, the piston will push on the control rod opening the next sequence valve, allowing air flow from this cylinder to flow into the cylinder being filled. A check valve may be used to keep air from the second storage cylinder from flowing back into the first storage cylinder. The process described above may continue with respect to each succeeding storage cylinder as air pressure is depleted.

With respect to refilling the storage cylinders, the air required to refill the storage cylinders may flow through a passage where it encounters check valves that prevent air from storage cylinders that are at higher pressures from flowing into storage cylinders that are at lower pressures, refill air will flow through the check valve only when the refill pressure exceeds that which is in the storage cylinder. The result is that the air supplied (either from a compressor or a large storage cylinder) starts to fill the lowest pressure cylinder first until the pressure in the system reaches the point at which the next check valve opens, then there will be two storage cylinders being filled at once. This process eventually includes all of the storage cylinders.

Figure 3:
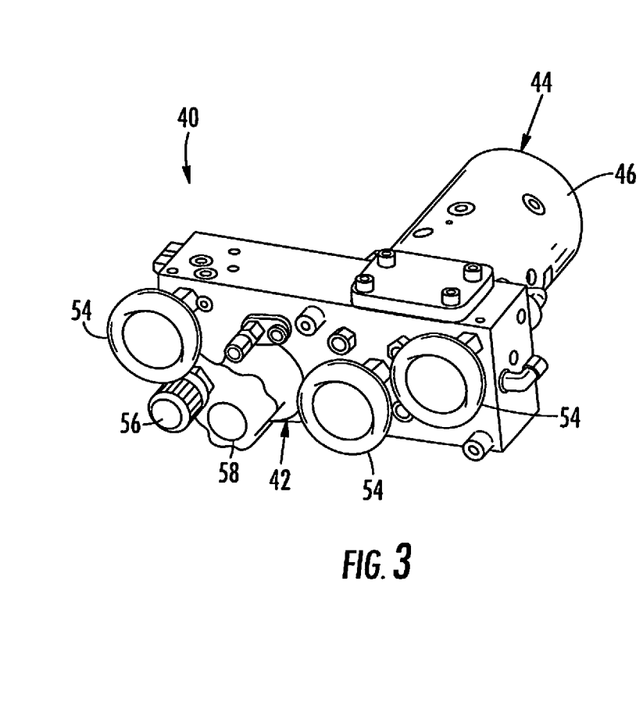
FIG. 3 illustrates a perspective front view of an auto cascade manifold system, according to an embodiment of the present disclosure.
Figure 4:
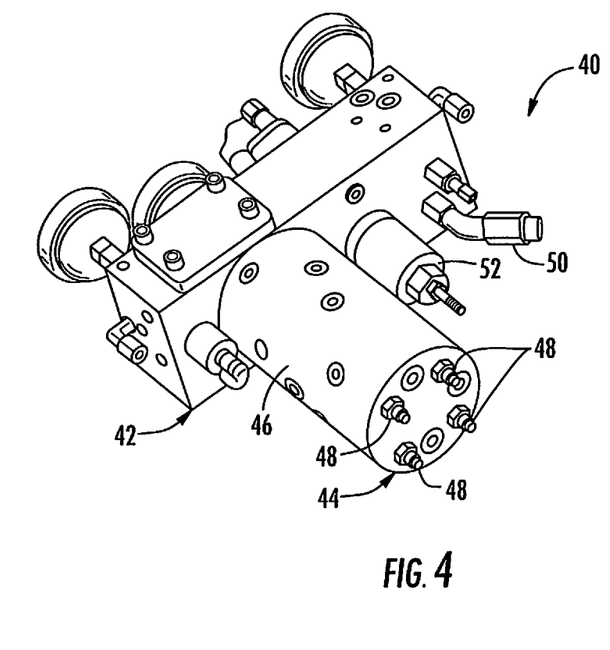
FIG. 4 illustrates a perspective rear view of an auto cascade manifold system, according to an embodiment of the present disclosure.

FIG. 3 illustrates a perspective front view of an auto cascade manifold system 40, according to an embodiment of the present disclosure. FIG. 4 illustrates a perspective rear view of the auto cascade manifold system 40. Referring to FIGS. 3 and 4, the system 40 may include a main control manifold, block, body, or the like 42 and a modular manifold assembly (or manifold module) 44 that may be removably secured to the main control manifold 42. The modular manifold assembly 44 includes a housing 46 that contains one or more sequence valves, check valves, and fluid passages, as described below.

The main control manifold 42 may include an outlet fitting 50 that may operatively connect to a charge station. The main control manifold 42 may also include a flow control valve 52 that may be configured to control a rate of fill from the storage cylinders to the fluid cylinder to be filled. The main control manifold 42 may also include a plurality of gauges 54, an on/off valve 56, and a regulator 58 that is configured to allow delivered air pressure to be adjusted.

The modular manifold assembly 44 may further include a plurality of hose fittings 48. Four hose fittings 48 are shown. However, more or less hose fittings 48 may be used, depending on the number of storage cylinders. Each hose fitting 48 is configured to connect to a respective storage cylinder. Thus, as shown in FIG. 4, the modular manifold assembly 44 may connect to four storage cylinders through the four hose fittings 48. The modular manifold assembly 44 includes a main control line that may operatively connect to each supply line connected to each of the hose fittings 48. One or more sequence valves, check valves, and/or the like within the modular manifold assembly 44 may operatively connect to a fluid supply line to allow fluid from each of the storage cylinders to be sequentially supplied to the fluid tank or cylinder via the charge station and the outlet fitting 50 of the main control manifold 42.

Figure 5:
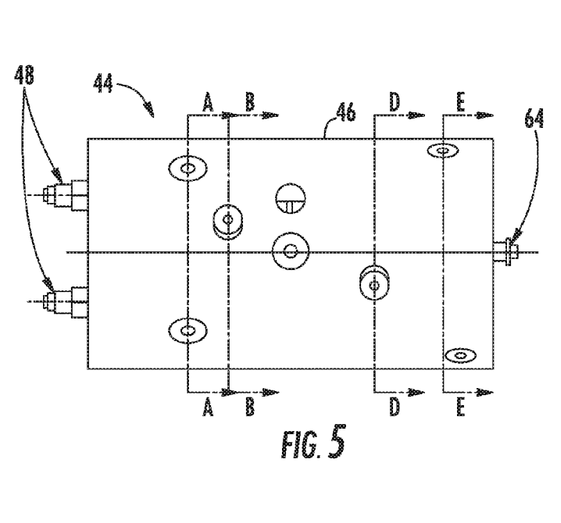
FIG. 5 illustrates a lateral view of a modular manifold assembly, according to an embodiment of the present disclosure.
Figure 6:
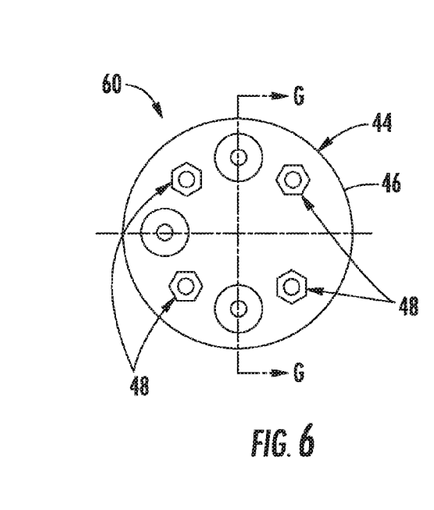
FIG. 6 illustrates a front view of a modular manifold assembly at a storage cylinder interface end, according to an embodiment of the present disclosure.
Figure 7:
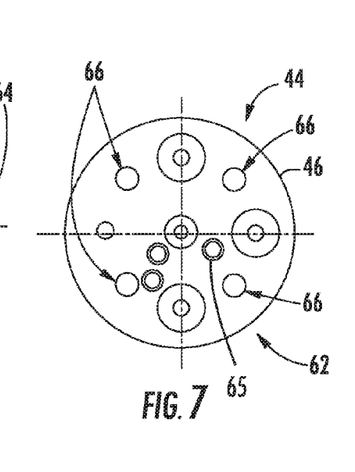
FIG. 7 illustrates a rear view of a modular manifold assembly at a block connection interface end, according to an embodiment of the present disclosure.

FIG. 5 illustrates a lateral view of the modular manifold assembly 44. FIG. 6 illustrates a front view of the modular manifold assembly 44 at a storage cylinder interface end 60, according to an embodiment of the present disclosure. FIG. 7 illustrates a rear view of the modular manifold assembly 44 at a block connection interface end 62.

Referring to FIGS. 5 and 7, the modular manifold assembly 44 may include a check valve 64 at the block connection interface end 62. The check valve 64 may be disposed at a terminal end of a main supply line within the housing 44. The modular manifold assembly 44 connects to the main control manifold 42 (shown in FIGS. 3 and 4) at the block interface end 62. The block connection interface end 62 may include O-rings 65 that seal air passages when the manifold 44 is attached to the main control manifold 42 and threaded mounting holes 66 that are configured to receive threaded fasteners that connect the block connection interface end 62 to the main control manifold 42.

Figure 8:
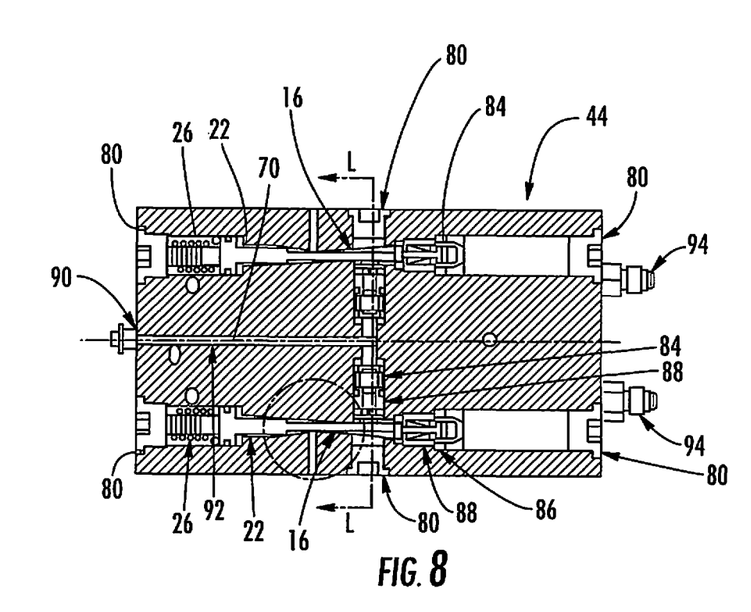
FIG. 8 illustrates a transverse cross-sectional view of a modular manifold assembly through line G-G of FIG. 6, according to an embodiment of the present disclosure.
Figure 9:
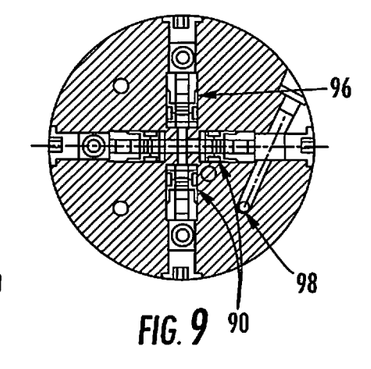
FIG. 9 illustrates an axial cross-sectional view of a modular manifold assembly through line L-L of FIG. 8, according to an embodiment of the present disclosure.
Figure 10:
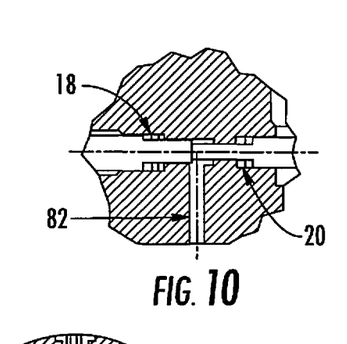
FIG. 10 illustrates a portion of a modular manifold assembly at detail M of FIG. 8, according to an embodiment of the present disclosure.

FIG. 8 illustrates a transverse cross-sectional view of the modular manifold assembly 44 through line G-G of FIG. 6, according to an embodiment of the present disclosure. FIG. 9 illustrates an axial cross-sectional view of the modular manifold assembly 44 through line L-L of FIG. 8, according to an embodiment of the present disclosure. FIG. 10 illustrates a portion of the modular manifold assembly 44 at detail M of FIG. 8, according to an embodiment of the present disclosure. FIGS. 8-10 illustrate sequence valves and a main supply line 70 (or air passage out) that are used to fill an SCBA cylinder, for example. Also shown in FIGS. 8-10 are an O-ring plug 80, vent to atmosphere 82, valve assembly 84, 86, valve seat 88, 96, check valve 90, air passage to fill SCBAs 92, and an air connection 94 to the storage cylinder.

FIGS. 8-10 show the air passages, sequence valves, and check valves used to control the flow of air from the storage cylinders to the breathing air cylinders being filled. Referring to FIGS. 8-10, as shown, the modular manifold assembly 44 includes a plurality of valve assemblies connected to a main supply line 70 through internal check valves. As shown in FIG. 9, the assembly 44 may include four different check valves arranged in a radial pattern. The check valves prevent backflow. The sequence valves allow fluid to be delivered from each storage cylinder to an SCBA cylinder, for example, based on the pressure differentials therebetween. The sequence valves open and close based on the pressure within each storage cylinder in relation to the pressure within the SCBA cylinder, for example.

Figures 11, 12:
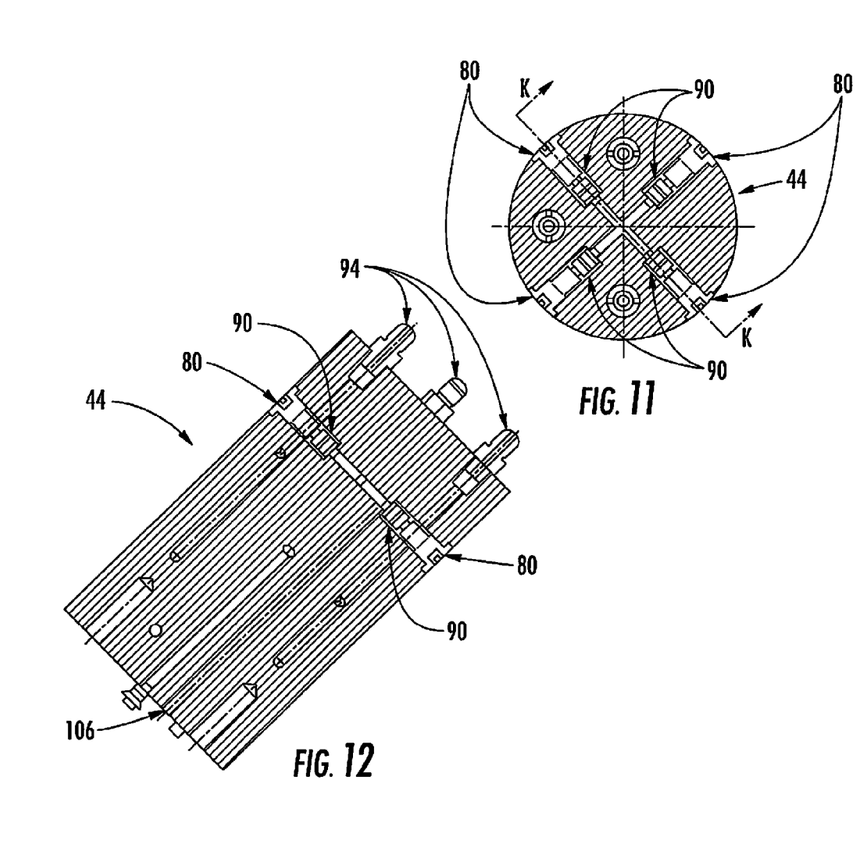
FIG. 11 illustrates a cross-sectional view of a modular manifold assembly through line A-A of FIG. 5, according to an embodiment of the present disclosure.
FIG. 12 illustrates a cross-sectional view of a modular manifold assembly through line K-K of FIG. 11, according to an embodiment of the present disclosure.

FIGS. 11 and 12 show the air passages and check valves used to refill the storage cylinders that connect to the air connections 94. The check valves 90 only allow air to flow out to the storage cylinders, and refill air pressure must be greater than storage pressure for each check valve 90 to open. FIG. 11 illustrates a cross-sectional view of the modular manifold assembly 44 through line A-A of FIG. 5, according to an embodiment of the present disclosure. FIG. 12 illustrates a cross-sectional view of the modular manifold assembly 44 through line K-K of FIG. 11, according to an embodiment of the present disclosure. Referring to FIGS. 11 and 12, the modular manifold assembly 44 may also include check valves and an air passage that may be used to fill storage cylinders. The passage 106 may be used to refill the storage cylinders. As shown, four check valves 90 may be arranged in a radial pattern. During refilling, the storage cylinder with the lowest pressure is filled first (passageway 98, as shown in FIG. 9). As the pressures within multiple storage cylinders equilibrate, both storage cylinders may be filled simultaneously. As the pressure within a storage cylinder increases in relation to another, the other storage cylinder begins to be filled, and the higher pressure cylinder is closed by a respective check valve, for example.

Figure 13:
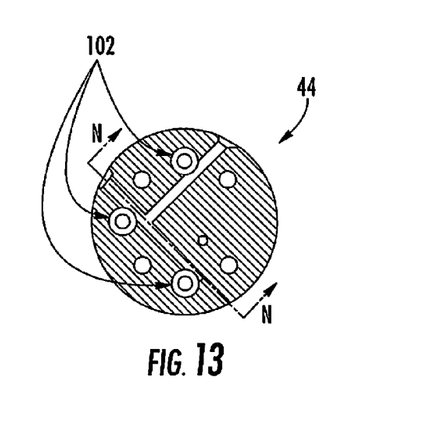
FIG. 13 illustrates a cross-sectional view of a modular manifold assembly through line E-E of FIG. 5, according to an embodiment of the present disclosure.
Figure 14:
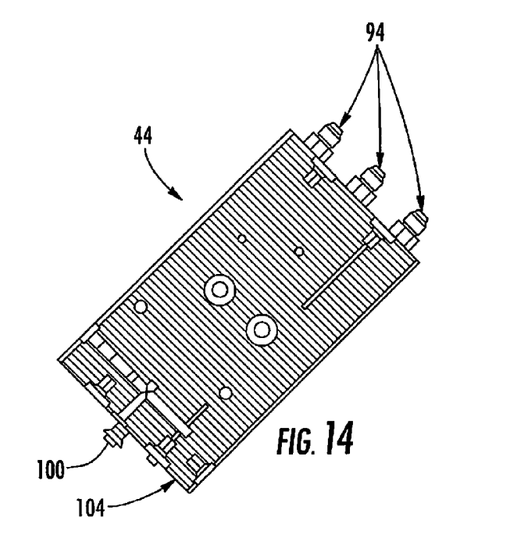
FIG. 14 illustrates a cross-sectional view of a modular manifold assembly through line N-N of FIG. 13, according to an embodiment of the present disclosure.

FIGS. 13 and 14 show the air passages for reference pressure from the breathing air cylinders being filled. FIG. 13 illustrates a cross-sectional view of the modular manifold assembly 44 through line E-E of FIG. 5, according to an embodiment of the present disclosure. FIG. 14 illustrates a cross-sectional view of the modular manifold assembly 44 through line N-N of FIG. 13, according to an embodiment of the present disclosure. Referring to FIGS. 13 and 14, a passage 100 may be formed through the modular manifold assembly 44 that may be used to provide a reference pressure from an SCBA cylinder, for example, and also shown are a sequence valve control piston upper chamber 102, and a mounting surface to the main control manifold 104.

Figure 15:
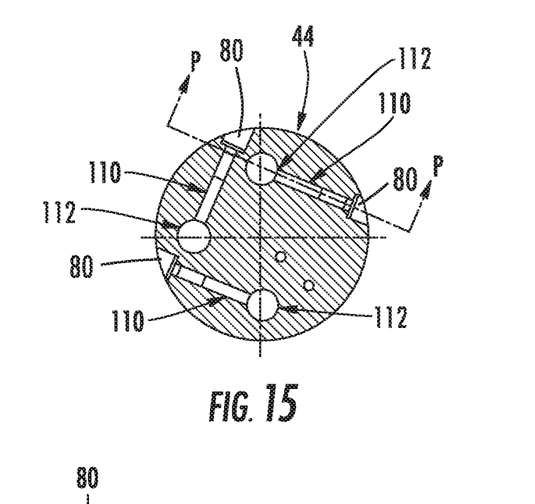
FIG. 15 illustrates a cross-sectional view of a modular manifold assembly through line B-B of FIG. 5, according to an embodiment of the present disclosure.
Figure 16:
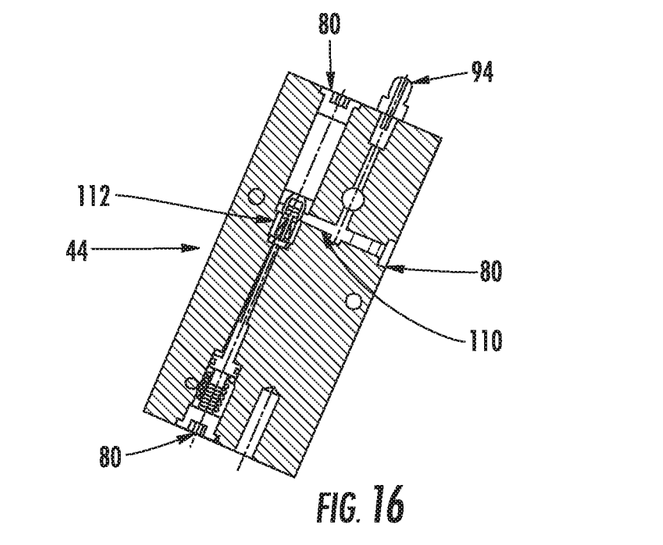
FIG. 16 illustrates a cross-sectional view of a modular manifold assembly through line P-P of FIG. 15, according to an embodiment of the present disclosure.

FIGS. 15 and 16 show the air passages through which air flows from the storage cylinder at air connection 94 to the sequence valve 112. FIG. 15 illustrates a cross-sectional view of the modular manifold assembly 44 through line B-B of FIG. 5, according to an embodiment of the present disclosure. FIG. 16 illustrates a cross-sectional view of the modular manifold assembly 44 through line P-P of FIG. 15, according to an embodiment of the present disclosure. Referring to FIGS. 15 and 16, the modular manifold assembly 44 may include storage air communication passages 110 that connect to one or more sequence valves 112.

Figure 17:
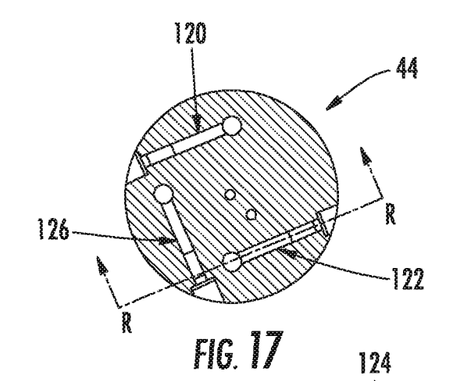
FIG. 17 illustrates a cross-sectional view of a modular manifold assembly through line D-D of FIG. 5, according to an embodiment of the present disclosure.
Figure 18:
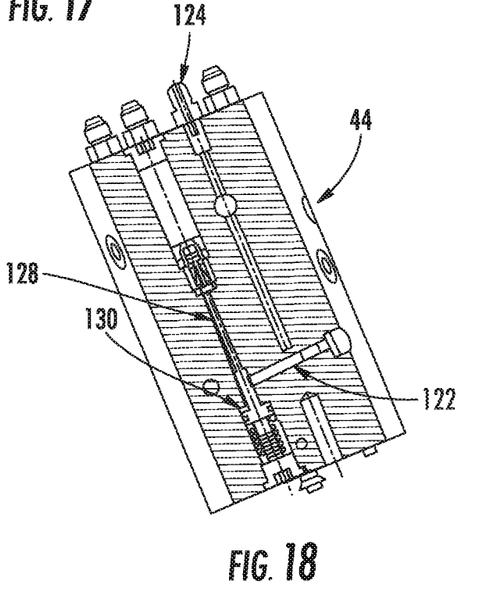
FIG. 18 illustrates a cross-sectional view of a modular manifold assembly through line R-R of FIG. 17, according to an embodiment of the present disclosure.

FIGS. 17 and 18 show the air passages that allow the air pressure from a lower-pressure cylinder to act on the sequence valve piston 130 of the next-higher-pressure storage cylinder. FIG. 17 illustrates a cross-sectional view of the modular manifold assembly 44 through line D-D of FIG. 5, according to an embodiment of the present disclosure. FIG. 18 illustrates a cross-sectional view of the modular manifold assembly 44 through line R-R of FIG. 17, according to an embodiment of the present disclosure. Referring to FIGS. 17 and 18, the modular manifold assembly 44 may include a control rod 128, storage air communication passages 120, 122, 126 from a lower pressure storage cylinder to the next higher pressure storage cylinder sequence valve piston's lower chamber, and an air connection 124 to storage cylinder. Note, the first storage cylinder may not be connected to a sequence valve.

Referring to FIGS. 1-18, embodiments of the present disclosure provide a modular manifold assembly that may include a main housing that contains one or more sequence valves that are used to sequentially draw air from storage tanks to fill an individual fluid tank or container, such as an SCBA tank.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A modular manifold assembly for an auto cascade system used to fill an individual fluid tank from a plurality of fluid storage cylinders, the modular manifold assembly comprising:
   a housing;
   a plurality of sequence valves within the housing;
   at least one fluid conduit within the housing; and
   a plurality of check valves arranged in a radial pattern within the housing, each of the plurality of check valves being connected to a corresponding one of the plurality of sequence valves,
   each of the plurality of sequence valves being configured to allow fluid to be sequentially drawn from a plurality of fluid storage cylinders.

2. The modular manifold assembly of claim 1, wherein the plurality of sequence valves are arranged in a circular pattern within the housing.

3. The modular manifold assembly of claim 1, wherein the at least one fluid conduit includes a main fluid supply line, the plurality of sequence valves being in fluid communication with the main fluid supply line.

4. The modular manifold assembly of claim 1, further comprising:
   at least one hose fitting; and
   a storage refill passage connected to at least one of the at least one hose fitting,
   the plurality of check valves being disposed between the at least one hose fitting and the storage refill passage.

5. A modular manifold assembly for an auto cascade system used to fill an individual fluid tank from a plurality of fluid storage cylinders, the modular manifold assembly comprising:
   a housing;
   a plurality of sequence valves within the housing, each of the plurality of sequence valves having:
      a valve portion having an inlet passage and an outlet passage;
      a control rod having a first end and a second end opposite the first end, the first end of the control rod being in mechanical communication with the valve portion;
      a piston having a first end and a second end opposite the first end, the second end having a first surface and a second surface opposite the first surface, the first end of the piston being in mechanical communication with the second end of the control rod; and
      a bias spring in mechanical communication with the piston second surface;
   a plurality of check valves, each of the plurality of check valves being in fluid communication with a corresponding one of the plurality of sequence valves; and
   at least one fluid conduit within the housing,
   each of the plurality of sequence valves being configured to allow fluid to be sequentially drawn from a plurality of storage cylinders,
   each of the plurality of check valves being at least substantially orthogonal to a corresponding one of the plurality of sequence valves.

6. A modular manifold assembly for an auto cascade system used to fill an individual fluid tank from a plurality of fluid storage cylinders, the modular manifold assembly comprising:
   a housing, the housing including:
      a first end having a plurality of hose fittings configured to couple the modular manifold assembly to the plurality of fluid storage cylinders;
      a second end opposite the first end, the second end having a check valve; and
      a main supply line;
   a plurality of sequence valves within the housing; and
   a plurality of check valves arranged in a radial pattern within the housing, the main supply line extending within the housing between the check valve of the second end of the housing and the plurality of check valves, each of the plurality of check valves being connected to a corresponding one of the plurality of sequence valves, each of the plurality of sequence valve being configured to allow fluid to be sequentially drawn from a plurality of storage cylinders.

7. A modular manifold assembly for an auto cascade system used to fill an individual fluid tank from a plurality of fluid storage cylinders, the modular manifold assembly comprising:
 a housing;
 a plurality of sequence valves within the housing, each of the plurality of sequence valves having:
  a valve portion having an inlet passage and an outlet passage;
  a control rod having a first end and a second end opposite the first end, the first end of the control rod being in mechanical communication with the valve portion;
  a piston having a first end and a second end opposite the first end, the second end having a first surface and a second surface opposite the first surface, the first end of the piston being in mechanical communication with the second end of the control rod; and
  a bias spring in mechanical communication with the piston second surface; and
 at least one fluid conduit within the housing,
 each of the plurality of sequence valves being configured to allow fluid to be sequentially drawn from a plurality of storage cylinders and each of the plurality of sequence valves being in fluid communication with a vent to atmosphere.

8. A modular manifold assembly for an auto cascade system used to fill an individual fluid tank from a plurality of fluid storage cylinders, the modular manifold assembly comprising:
 a housing;
 a plurality of sequence valves arranged in a circular pattern within the housing, each of the sequence valves being in fluid communication with a corresponding one of the plurality of fluid storage cylinders;
 a plurality of check valves arranged in a radial pattern within the housing, each of the plurality of check valves being in fluid communication with a corresponding one of the plurality of sequence valves;
 a fluid supply line within the housing and in fluid communication with the plurality of check valves; and
 each of the individual fluid tank and the plurality of fluid storage cylinders having a fluid pressure, the plurality of sequence valves allowing a fluid flow from at least one of the plurality of fluid storage cylinders sequentially into the individual fluid tank based on a difference between the fluid pressure in the individual fluid tank and the fluid pressure of the at least one of the plurality of fluid storage cylinders.

9. The modular manifold assembly of claim 8, wherein fewer than all of the fluid storage cylinders are in fluid communication with a corresponding one of the plurality of sequence valves.

10. The modular manifold assembly of claim 8, wherein each of the plurality of sequence valves is at least substantially orthogonal to a corresponding one of the plurality of check valves.

11. The modular manifold assembly of claim 8, wherein each of the plurality of sequence valves is in fluid communication with a vent to atmosphere.

12. The modular manifold assembly of claim 8, wherein the housing includes:
 a first end having a plurality of hose fittings configured to couple the modular manifold assembly to the plurality of fluid storage cylinders;
 a second end opposite the first end and having a check valve; and
 a main supply line extending within the housing between second end check valve and the at least one check valve.

13. The modular manifold assembly of claim 8, further comprising:
 at least one hose fitting;
 a storage refill passage connected to the at least one hose fitting; and
 at least one check valve disposed between the at least one hose fitting and the storage refill passage.

14. The modular manifold assembly of claim 8, wherein each of the plurality of sequence valves includes:
 a valve portion having an inlet passage and an outlet passage;
 a control rod having a first end and a second end opposite the first end, the first end of the control rod being in mechanical communication with the valve portion;
 a piston having a first end and a second end opposite the first end, the first end of the piston being in mechanical communication with the second end of the control rod, the second end of the piston having a first surface and a second surface opposite the first surface; and
 a bias spring in mechanical communication with the piston second surface.

15. The modular manifold assembly of claim 14, wherein the valve portion is configured to be in an open position when a pressure against the piston second surface is greater than a pressure against the piston first surface.

16. A modular manifold assembly for an auto cascade system used to fill an individual fluid tank from a plurality of fluid storage cylinders, the modular manifold assembly comprising:
 a housing including:
  a longitudinal axis;
  a first end having a plurality of hose fittings configured to couple the modular manifold assembly to the plurality of fluid storage cylinders;
  a second end opposite the first end; and
  a main fluid supply line;
 a plurality of sequence valves arranged in a circular pattern within the housing, each of the sequence valves being configured to be in fluid communication with a corresponding one of the plurality of fluid storage cylinders, each of the sequence valves including:
  a valve portion having an inlet passage and an outlet passage;
  a control rod having a first end and a second end opposite the first end, the control rod first end being in mechanical communication with the valve portion;
  a piston having a first end and a second end opposite the first end, the first end of the piston being in mechanical communication with the second end of the control rod, the second end of the piston having a first surface and a second surface opposite the first surface; and
  a bias spring in mechanical communication with the piston second surface;
 a plurality of check valves arranged in a radial pattern within the housing, each of the plurality of check valves being in fluid communication with a corresponding one of the plurality of sequence valves, each of the plurality of check valves being at least substantially orthogonal to the corresponding one of the plurality of sequence valves, the main fluid supply line being in fluid communication with the plurality of check valves; and the plurality of sequence valves being configured to allow a fluid flow from at least one of the plurality of fluid storage cylinders sequentially into the individual fluid tank when a pressure against the piston second surface of at least one of the plurality of sequence valves is greater than a pressure against the piston first surface of the at least one of the plurality of sequence valves.

* * * * *